United States Patent Office 3,317,453
Patented May 2, 1967

3,317,453
COPOLYMERS OF VINYL ACETATE, ACRYLIC ACID, AND GLYCIDAL METHACRYLATE AND CROSSLINKED PRODUCTS THEREOF
Angus N. MacDonald, Longmeadow, and Gary P. Rabold, Boston, Mass., assignors, by mesne assignments, to Monsanto Company, a corporation of Delaware
No Drawing. Filed Feb. 3, 1964, Ser. No. 342,269
5 Claims. (Cl. 260—33.4)

This invention relates to new crosslinkable vinyl copolymers. More particularly, it relates to certain stable vinyl copolymers that can be crosslinked with ease to completely insoluble materials. The invention relates also to a process for making said copolymers.

It is quite common, in the surface coating field, to apply a thermoplastic resin to a given object or article and then to cause the resin to cure or set to a rigid, insoluble or even infusible state. The cure generally involves crosslinking, which is to say that there has been mixed with the thermoplastic resin, prior to application, polyfunctional compound capable of reacting with certain chemical groups present on the resin molecule, and that under the influence of heat, catalysts and promoters, the potential reactions now take place to affect the resin in the proposed manner. In this manner for instance, a well known crosslinking system takes advantage of the reactivity of the epoxide functional group with such other groups as acids, amines, amides and alcohols. In such a case, there is mixed at the point of use a resin or a compound containing the epoxide group with another resin or compound containing at least one type of the labile hydrogen containing groups just mentioned. This mixing at the point of use while inconvenient is necessitated by the normally short life of the system once the two functionalities are present in a reactive medium.

This two package system can be avoided in certain cases according to Bilton et al., U.S. Patent 2,604,463. In that patent, there is described a method for incorporating both crosslinking functions into the polymer molecule itself. This is accomplished by batch polymerization of the monomers at moderately elevated temperatures and preferably in solution in inert organic solvents. The resulting copolymer containing both glycidyl and carboxyl groups can be cured by heating. The cure however is relatively long, e.g. more than 2.5 hours at 100° C. and the cured product remains partly soluble in acetone.

It is therefore an object of this invention to provide new copolymers that are self-curing. Another object is to provide copolymers that can be cured either at room temperature or more quickly at elevated temperature. Still another object is to provide copolymers that cure easily and quickly to completely insoluble products. A further object is to provide a method by which these new copolymers can be prepared.

These and other objects which will become evident in the course of the following description have been accomplished by polymerizing in bulk with heating and in the presence of an addition polymerization catalyst a mixture of one or more vinyl or acrylic type of monomer free from labile hydrogen atoms, a polymerizable olefinic acid or another polymerizable compound capable of reacting with the epoxy functions, and a glycidyl ester of a polymerizable olefinic acid, the major part of the last two ingredients being added to the polymerization mixture gradually over a delayed period.

The detail and manner of practicing the present invention will become apparent on reference to the following examples. All parts and percentages given therein are on a weight basis. These examples are merely illustrative and do not limit the scope of the invention.

Example 1

A terpolymer was prepared from the following monomer mixture: vinyl acetate—88% (90 mole-percent), acrylic acid—4% (5 mole-percent), and glycidyl methacrylate—8% (5 mole-percent)). The polymerization was started in bulk with all the vinyl acetate, small amounts of the acrylic acid and the glycidyl methacrylate (about 10% of the total quantity to be used), and 0.5 part per hundred, based on the total monomer weight of $\alpha,\alpha'$-azodiisobutyronitrile as polymerization initiator. The major portion of the acrylic acid and the glycidyl methacrylate was dissolved in a small quantity of ethyl alcohol and added to the polymerization mixture over a period of approximately 4 hours. More $\alpha,\alpha'$-azo-diisobutyronitrile, 0.2 part, was added at this point and the reaction was allowed to proceed until a temperature of 78° C. was reached. It was completed at this point. The solids contents of the resulting mixture was brought to 50% by dilution with ethyl alcohol.

A cast film of the material cured for 5 minutes at 90° C. or allowed to stand 4 days at room temperature was quite resistant to the vapors of refluxing ethyl alcohol; none of it dissolved. The test was carried out by placing the film over a beaker of boiling ethyl alcohol for a period of 15 to 20 minutes and noting the effect of the treatment on the film. Other solvents, such as methyl ethyl ketone, ethyl acetate and so on, were equally ineffective after this mild curing cycle.

Example 2

In contrast to this, mixtures of the following two copolymers required a cure temperature of approximately 30° higher, i.e. 120° C.: a glycidyl methacrylate (5 mole-percent)-vinyl acetate (95 mole-percent) copolymer with an equivalent amount of a vinyl acetate-monomethyl maleate copolymer containing 5 mole-percent of the latter type of units.

Example 3

Also, mixtures of a glycidyl methacrylate-vinyl acetate (95 mole-percent) copolymer with equivalent or equimolar amounts of adipic or azelaic acid required cures at temperatures at least 45° higher than the terpolymer of Example 1. It is readily understood that such higher curing temperatures seriously restrict the choice of substrate that can be coated with the materials of the invention.

Example 4

A random copolymer of dibutyl maleate (25%) vinyl acetate (69.2%) acrylic acid (4.8%) and glycidyl methacrylate (1%) was formed by the method of Example 1. The product was diluted to a solids content of approximately 56% with ethyl alcohol (No. 35A) to give a solution with a Brookfield viscosity of 10,000 centipoises at 25° C. Films cast from this solution were clear, smooth, glossy, flexible and non-tacky. They possessed high tensile strength which improved on aging or curing. On bonding vinyl chloride film to matted fiberglass, it was found that the bond resisted a peeling force of 10 grams/two inch width at a temperature of 60° C. for a minimum period of 4 days. This material on the other hand did not cure as readily as that of Example 1.

Example 5

The terpolymer of Example 1 mixed with 1% of triethanolamine titanate was cured to ethyl alcohol insolubility in 2 days only at room temperature. The same degree of cure was accomplished in 5 minutes at 77° C. Fair solvent resistance was imparted by a 30 minute cure at 65° C.

As intimated earlier, the polymers of this invention must contain at least three different types of units. The bulk of the monomer composition which gives rise to the polymer consists of one or more polymerizable monoethylenically unsaturated compounds which are free of any group capable of reacting with the epoxide groups and with the carboxyl groups of the compounds which make up the rest of the polymerization mixture. In practice this means that said major component or components must not contain any free carboxylic group, any alcohol group, any amine, etc. or, in other words, must be free of labile hydrogen atoms. Typical of compounds meeting these requirements are acrylic, haloacrylic and methacrylic esters such as for example methyl acrylate, ethyl acrylate, butyl acrylate, isobutyl acrylate, octyl acrylate, dodecyl acrylate, 2-ethylhexyl acrylate, methoxymethyl acrylate, chloroethyl acrylate and the corresponding esters of methacrylic and α-chloroacrylic acids; vinyl and vinylidene halides, such as vinyl chloride, vinyl fluoride, vinylidene chloride and vinylidene fluoride; vinyl aryls such as styrene and vinyl naphthalene; vinyl esters, for example vinyl acetate, vinyl chloroacetate, vinyl propionate, vinyl 2-ethylhexoate, and so on.

Crosslinking of the polymer upon curing is assured by the incorporation, in the appropriate manner, of a labile hydrogen compound and an epoxy compound in the monomer composition. With respect to the epoxy compound, any of the glycidyl esters of the polymerizable ethylenically unsaturated acids will serve: e.g. glycidyl acrylate, glycidyl crotonate, glycidyl methyl maleate, and so on. The labile hydrogen atom containing component of the crosslinking system can be, for example, a compound containing a free carboxyl group such as crotonic acid, methacrylic acid, itaconic acid, monomethyl maleate, etc., or an amine, amide, hydroxyl or mercapto group such as acrylamide and hydroxyethyl methacrylate.

As to the proportions of monomeric units in the polymers of the invention, they are best expressed as follows: in the preferred embodiments of the invention, the product of the mole-percent content of the glycidyl ester in the monomer composition by the mole-percent content of the labile hydrogen containing compound in the same monomer composition should approximate 25 with the proviso that at least 2.5 mole-percent of the minor component be present. The rest of the composition as already stated is made of a monomer or a mixture of monomers which cannot participate directly in the cure reaction. Without achieving the optimum rapidity and excellence of cure afforded by the compositions just described, improved cures over the compositions of the art can be obtained with compositions in which the product of the mole-percent contents of crosslinking agents is within the range of 10 to 30, said contents being at least 1 mole-percent for the minor component and not more than about 20% for both crosslinking components.

The polymerization process employed in the invention is critical. Its essential features, namely the delayed and gradual addition of the major part of the crosslinking monomers as well as the temperature level permissible, have been described in Example 1. How much of the crosslinking monomers can be incorporated in the initial charge of the polymerization kettle is a matter to be resolved in the light of the particular monomers selected. The actual amount can be determined readily, as for instance in the case of the vinyl acetate-acrylic acid-glycidyl methacrylate system where a hazy polymeric solution is obtained and an impairment of the crosslinking process is observed when more than 10% of the total amount of crosslinking monomer to be used is so incorporated. It might also be pointed out that the polymeric product resulting from this process is not linear in that the temperatures used favor the formation of some interchain linkage, a desirable development which contributes to the special curing behavior of the present materials. The polymerization can be carried out at any temperature up to 90° C., the preferred range being from about 60° to 80° C. The resin solutions thus produced are compatible with a great variety of organic solvents and in that sense the invention is not limited to the use of ethyl alcohol as might be implied from the examples. Examples of solvents which may be employed in the addition of crosslinking monomers and for dilution of the finished product to the desired solids content are acetone, butyl alcohol, 2-ethoxyethyl alcohol, 2-butoxyethyl alcohol, carbon tetrachloride, ethyl acetate, hexane, methyl alcohol, methyl isobutyl ketone, toluene, trichloroethane, mixtures thereof, and so on.

The catalyst, which should be employed in quantities of 0.2 to 5% by weight, based on the total monomer charge, can be any one of the usual addition polymerization catalysts. Included in these classes are peroxides, persulfates and azo compounds such as benzoyl peroxide, tertiary-butyl perbenzoate, potassium persulfate, dimethyl azo-bis(isobutyrate) and azo-bis(α-methylcapronitrile), and so on.

Finally, as shown in the examples, the already excellent curing characteristics of the compoistions of this invention can yet be improved by the incorporation of certain titanium-amine complexes such as triethanolamine titanate and similar esters of titanic acid in quantities within the range of 0.1 to 5% by weight based on the polymer.

The principal utility of the copolymers of this invention resides in solvent resistance surface coating, principally the coating of materials available for reasons of heat sensitivity, length of cure, etc. The stable coating compositions can also be exploited for their adhesive properties which, according to the variations permissible within the limits of this description, could be effective with a large variety of materials.

What is claimed is:

1. A process for the preparation of a stable copolymer capable of self-curing at room temperature, which consists in heating together at temperatures of from about 60° to 80° C. in the presence of an addition polymerization catalyst, a mixture consisting of vinyl acetate, acrylic acid and glycidal methacrylate; wherein a total of 90 mole percent vinyl acetate, 5 mole percent acrylic acid and 5 mole percent glycidal methacrylate are used and wherein at least 90% of the acrylic acid and glycidal methacrylate is added gradually over a period of approximately 4 hours.

2. A stable coating composition consisting of up to a 50% by weight ethyl alcohol solution of the porduct obtained by the process of claim 1.

3. A quick-curing composition consisting of the polymeric product of claim 1 mixed with a titanium-amine complex compound.

4. A quick-curing composition consisting of the polymeric product of claim 1 mixed with 0.1 to 5% by weight, based on the polymeric product, of an ester of orthotitanic acid.

5. A quick-curing composition consisting of the polymeric product of claim 1 mixed with 1.0% by weight, based on the polymeric product, of triethanolamine titanate.

References Cited by the Examiner

UNITED STATES PATENTS

| | | | |
|---|---|---|---|
| 2,470,324 | 5/1949 | Staudinger et al. | 260—87.7 |
| 2,604,463 | 7/1952 | Bilton et al. | |
| 2,687,404 | 8/1954 | Robertson. | |
| 3,025,181 | 3/1962 | Nuessle et al. | |
| 3,223,670 | 12/1965 | Cantor et al. | |

OTHER REFERENCES

The Condensed Chemical Dictionary, 6th Edition, pp. 1145, 1164, 1961.

MORRIS LIEBMAN, *Primary Examiner.*

L. T. JACOBS, *Assistant Examiner.*